United States Patent
Krutyolkin et al.

(10) Patent No.: US 8,458,136 B2
(45) Date of Patent: Jun. 4, 2013

(54) SCHEDULING HIGHLY PARALLEL JOBS HAVING GLOBAL INTERDEPENDENCIES

(75) Inventors: Sergey Krutyolkin, Haifa (IL); Aviad Sela, Yokneam (IL); Uri Shani, Q. Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/898,736

(22) Filed: Oct. 6, 2010

(65) Prior Publication Data
US 2011/0023044 A1 Jan. 27, 2011

Related U.S. Application Data

(63) Continuation-in-part of application No. 12/509,507, filed on Jul. 27, 2009, now Pat. No. 8,180,739.

(51) Int. Cl.
*G06F 17/30* (2006.01)
(52) U.S. Cl.
USPC .......................................................... 707/654
(58) Field of Classification Search
USPC .......................................................... 707/654
See application file for complete search history.

(56) References Cited

U.S. PATENT DOCUMENTS

| | | | |
|---|---|---|---|
| 6,052,707 A | 4/2000 | D'Souza | |
| 2009/0031312 A1* | 1/2009 | Mausolf et al. | 718/102 |
| 2009/0113432 A1 | 4/2009 | Singh et al. | |

\* cited by examiner

*Primary Examiner* — Khanh Pham
*Assistant Examiner* — Johnese Johnson

(57) ABSTRACT

A method of scheduling highly parallel jobs with global interdependencies is provided herein. The method includes the following steps: grouping input elements, each group being associated with an interdependency tag reflecting a level of interdependency between data associated with different input elements within a group; clustering the groups into collections of groups, wherein the clustered groups are associated with an interdependency tag reflecting a level of interdependency between groups, above a specified value; applying a conflict check to the collections of groups and to active jobs of a working set, to yield a conflict level between each collection of groups and each active job, by analyzing the interdependency tags of the collections of groups vis à vis interdependency tags associated with the active jobs; and adding collections of groups into the working set, wherein added collections of groups are associated with a conflict level below an acceptable conflict level.

21 Claims, 3 Drawing Sheets

SCHEDULING HIGHLY PARALLEL JOBS HAVING GLOBAL INTERDEPENDENCIES

CROSS-REFERENCE TO RELATED APPLICATIONS

The present application claims the benefit under 35 U.S.C. §120 to, and is a continuation-in-part of application Ser. No. 12/509,507 filed on Jul. 27, 2009 now U.S. Pat. No. 8,180,739, the content of which is incorporated herein by reference in its entirety.

BACKGROUND

1. Technical Field

The present invention relates to projects management and more particularly, to scheduling highly parallel jobs with global interdependencies.

2. Discussion of the Related Art

High-throughput processing systems operate by continuously starting jobs (or tasks) each of which processes a portion of input data. Meanwhile, input is continuously streamed into a staging area. The jobs are scheduled to work by a scheduler configured to: examine the input data, divide it to suitable sized portions, and start a job for each distinct portion.

Examples of such systems are in the Telco domain, where Call Detailed Records (CDRs) are streamed by billions of CDRs per day, and which are then processed by such a system. In particular, the stream of CDRs is divided to pre-designed size of portions and numerous jobs are started, each processing its own portion. A more general system to reference is the Hadoop system where given a large portion of input data, it is assigned to start a job which, in-turn is divided to smaller tasks distributed over a possibly large group of machines that work on the data portion in massive parallelism.

When input data is fully independent, it is easy to apportion the input to portions of any desired size and to schedule jobs to process each portion. Being fully independent, any number of jobs can run in parallel and thus provide a scalable processing solution.

The challenge begins when the input exhibits dependency among its data, while the system still requires making best effort to issue as high number of parallel jobs to process the input as the hardware/software configuration makes possible for optimized use of these resources.

An example of such dependency is when trying to filter duplicate data items on a global scale, meaning that if each input item can be identified with a global unique id, than to identify each data item as original or duplicate requires to maintain some global index, which must be accessed in parallel by all concurrently working jobs, where access is for both read and update, fully synchronized. Yet, it is desired to keep each job processing totally independent of the other jobs, and eliminate contention with the other jobs. The update of a single index by multiple agents requires that they are synchronized, and that creates contention among them and slows down performance.

BRIEF SUMMARY

One aspect of the invention provides a method that may include the following steps: grouping input elements into groups, each group being associated with an interdependency tag reflecting a level of interdependency between data associated with different input elements within a group; clustering the groups into collections of groups to yield collections of groups wherein the clustered groups are associated with an interdependency tag reflecting a level of interdependency between groups, above a specified value; applying a conflict check to the collections of groups and to active jobs of a working set, to yield a conflict level between each collection of groups and each active job, by analyzing the interdependency tags of the collections of groups vis à vis interdependency tags associated with the active jobs; and adding collections of groups into the working set, wherein added collections of groups are associated with a conflict level below an acceptable conflict level.

Other aspects of the invention may include a scheduler arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
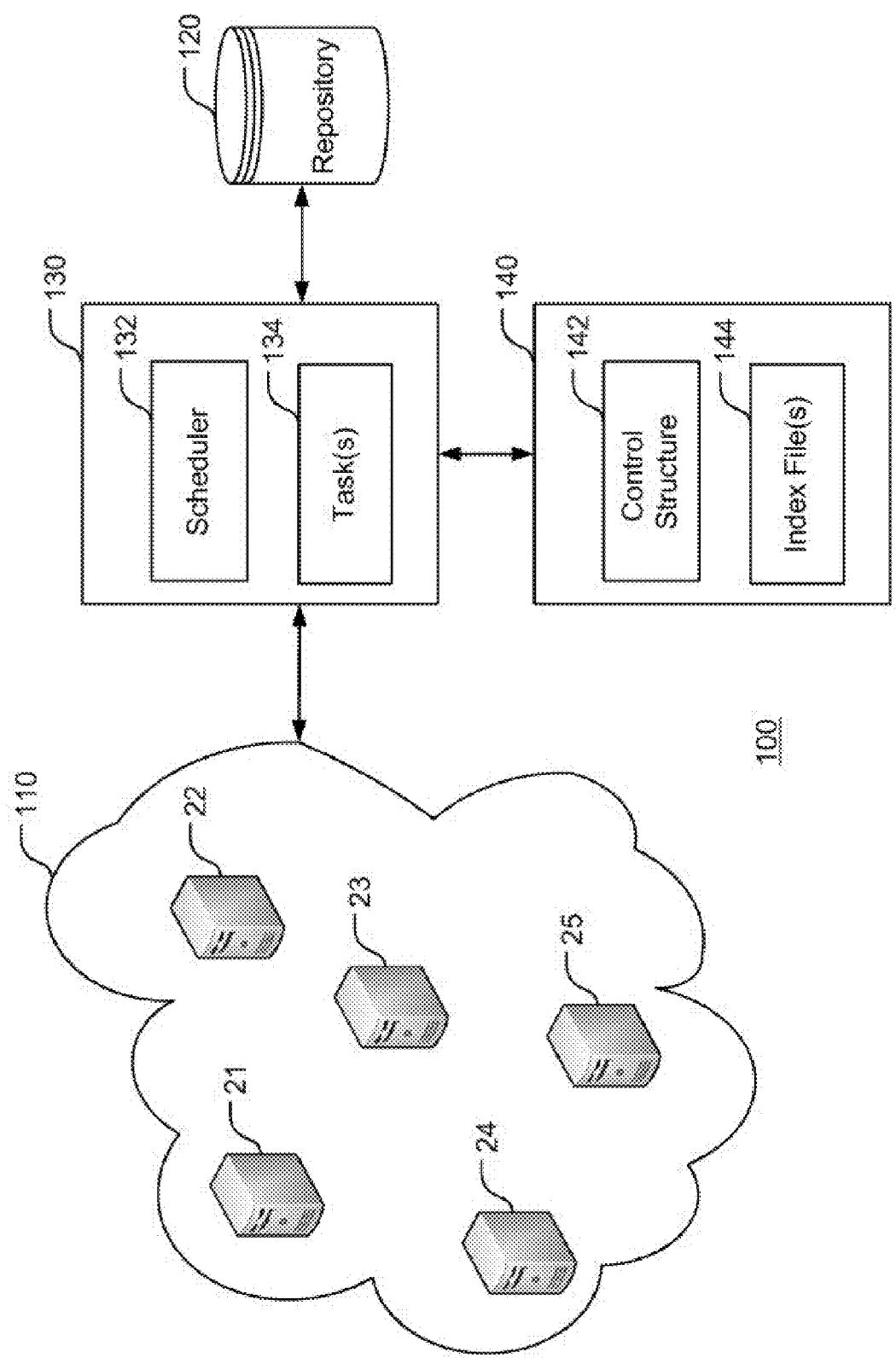
FIG. 1 is a high level schematic block diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "task" or "job" as used herein in this application refers in project management to an activity that needs to be accomplished within a defined period of time. An assignment is a task or job under the responsibility of an assignee which should have a start and end date defined. One or more assignments on a task put the task under execution. Completion of all assignments on a specific task should claim the task as completed. Tasks can be linked together to create dependencies. While task dependencies is a normal situation, this can lead to the stagnation (or starvation) of a project when a lot of tasks cannot get started unless others are finished.

The term "scheduling" as used herein in this application is a key concept in computer multitasking, multiprocessing operating system and real-time operating system designs. Scheduling refers to the way processes are assigned to run on the available CPUs, since there are typically many more processes running than there are available CPUs. This assignment is carried out by software known as a scheduler and dispatcher. The scheduler is concerned mainly with: CPU utilization—to keep the CPU as busy as possible; through-put—number of processes that complete their execution per time unit; turnaround—total time between submission of a process and its completion; waiting time—amount of time a process has been waiting in the ready queue; response time—amount of time it takes from when a process was submitted until it is completed; and fairness—equal rights for CPU time to each executing process.

The term "working set" as used herein in this application refers to a set of tasks assigned for execution and which have not finished execution yet. In consequence, this is the set of processes that compete on the CPU usage.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary environment according to one embodiment of the present invention. Exemplary data processing environment 100 includes a network 110 of one or more devices 21-25 that generate a stream of data records, a repository 120 for storing the records, a parallel processing system (PPS) 130 for processing the records, and an index system 140 for identifying records stored in the repository 120. In one implementation, for example, the repository 120 may be a database, and the PPS 130 may be an application executed by the database management system (DBMS).

In one embodiment, if there are a large number of data records arriving in the stream, the PPS 130 executes a scheduler 132 that divides the stream into one or more sets of records. Each set of records is processed by a task 134 executed in parallel with other tasks 134 by the PPS 130. For example, if a system receives about one billion records each day and each task executed by the system processes about a 1000 records per second, the system may execute at least 12 tasks in parallel to continuously sustain the stream of records. Desirably, as the number of records increases, the degree of independence between the tasks 134 may be increased proportionally to allow more tasks to be executed concurrently.

Each data record in the stream may be identified according to values associated with one or more fields, or keys. In one embodiment, one or more of the keys may be used to provide a higher-order value, and the rest of the keys may be used to provide a lower-order value. The higher-order value may be shared by one or more data records, while the lower-order value may be used in combination with the higher-order value to identify a particular record.

For example, a data record of a transaction may be identified by identification (ID) of a device that performed the transaction, a time slot during which the transaction occurred, the time of the transaction, and an ID for the user who requested the transaction. In such a scenario, the higher-order value may be a combination of the device ID and the time slot, and the lower-order value may be a combination of the transaction time and the user ID.

In some embodiments, scheduler 132 divides the stream of records into sets according to the higher-order values (e.g., device IDs and time slots) provided by the records. For example, a first set of records may comprise records that share a first higher-order value (e.g., device ID="001" and time slot="morning"), and a second set of records may comprise records that share a second higher-order value (e.g., device ID="002" and time slot="afternoon"). In one implementation, if a set of records is saved as an input file, the name of the input file may provide the higher-order value (e.g., file name="morning/001". In another implementation, the higher-order value may be provided in a separate metadata file that accompanies the input file.

Each higher-order value may be registered with a persistent control structure 142 included in the index system 140. Persistence refers to the ability to retain data after completing the execution of the program or process that generated the data. In one exemplary embodiment, the control structure 142 may be implemented as a table and a higher-order value may be registered with the control structure 142 by adding a row to the table. It is noteworthy, however, that the control structure 142 may be implemented in form of other types of data structures such as arrays and hash maps, for example.

A persistent index file 144 may be generated in the index system 140 for each higher-order value (e.g., for each device ID and time slot combination) that is registered with the control structure 142. Each index file 144 may save a lower-order value (e.g., the transaction time and user ID) provided by each record that shares the higher-order value for which the index file 144 was generated.

In addition to the aforementioned embodiments, scheduler 132 may be further configured to receive the incoming sequence of input elements and assign the tasks (jobs) to the computing devices 21-25 in other manners as will be explained in further details hereinafter.

Figure 2:
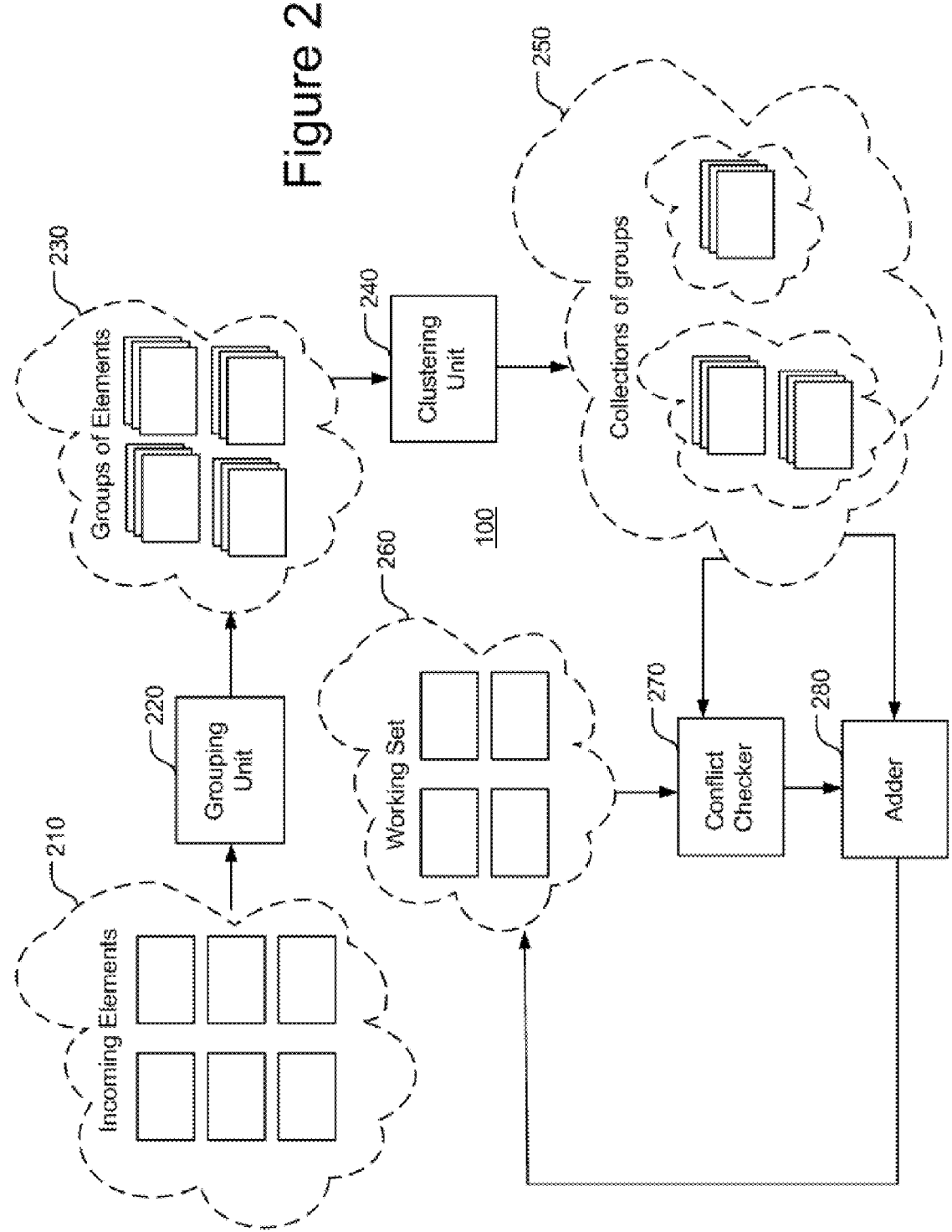
FIG. 2 is a high level schematic block diagram illustrating a system according to some embodiments of the invention.

FIG. 2 is a high level schematic block diagram illustrating a system according to some embodiments of the invention. Consistent with some embodiment of the invention, it is assumed that there is a well defined universe of interdependent items. The items in this universe are associated with the aforementioned input elements. For example, data records are input elements, certain fields in these records represent items whose values may be repeated in other records, thus creating a dependency between these records.

An exemplary embodiment is when these fields form a unique identification of these records, and having two records with same identification makes them duplicates of each other, where the first record to be encountered is considered the "original" and the second is the "duplicate".

Scheduler 132 may include a grouping unit 220 configured to group input elements 210 into groups 230, each group being associated with an interdependency tag reflecting a level of interdependency between data associated with different input elements within a group. Scheduler 132 may also include a clustering unit 240 configured to cluster the groups into collections of groups 250 wherein each one of the collections of groups 250 is associated with an interdependency tag reflecting a level of interdependency between groups, above a specified value. In addition, a conflict checker 270 is provided and configured to apply a conflict check to the collections of groups 250 and to active jobs of a working set 260, to yield a conflict level between each collection of groups 250 and each active job, by analyzing the interdependency tags of the collections of groups 250 vis à vis interdependency tags associated with the active jobs 260. Finally, there is provided an adder 280 configured to add collections of groups into the working set 260, wherein added collections of groups are associated with a conflict level below an acceptable conflict level.

In operation, the input stream of input elements is grouped into files, or can be split into files, each of which can be considered a basis for a portion that an individual processing job will process in parallel to other jobs. Scheduler 132 may analyze these portions, assign them dependency tags according to the items of their content, and schedule the files to jobs accordingly.

In order to implement the aforementioned feature, a collection of items in a certain portion can be collectively tagged in an extension of the individual item so that conflicting dependencies among portions can be calculated. Therefore, if two items can be conflicting or not according to a certain comparison rule, this rule can be extended to a group of items so that two groups can be considered conflicting or not in the sense that if the two groups are conflicting, than there are at least one element in each group which conflict each other. Likewise, two groups are not conflicting meaning that there are no two items, one from each group which are conflicting.

The aforementioned extension of the conflict relation is extended even further to be applied to collection of groups, so that two collections of groups may conflict if any two groups in the collections, one in each collection are conflicting Likewise, two collections are not conflicting meaning that there are no two groups, one from each collection which are conflicting.

In an exemplary embodiment, the conflict relation can have a metric which can evaluate the level of conflict between two items, group of items, or a collection of groups. At least, this metric may be binary: 1 for conflict, 0 for none. Alternatively it may be continuous over a range between 0 and 1.0.

Consistent with one embodiment of the invention, the adder 280 is further configured to repeat the adding until the working set reaches a specified target size.

Consistent with one embodiment of the invention, in case the working set does not reach the specified target size, the acceptable conflict level is increased to a relaxed specified conflict level.

Consistent with one embodiment of the invention, scheduler 132 is further configured to resume processing of the working set with the added collections of groups whenever the target size is not reached within a specified period of time.

Consistent with one embodiment of the invention, scheduler 132 is further configured to submit new jobs to the working set, wherein the new jobs are configured to process added collection of groups that are not being processed by the active jobs.

Consistent with one embodiment of the invention, grouping unit 220 is further configured to repeat the grouping with additional incoming input elements in a rate based at least partially on the size of the working set.

Figure 3:
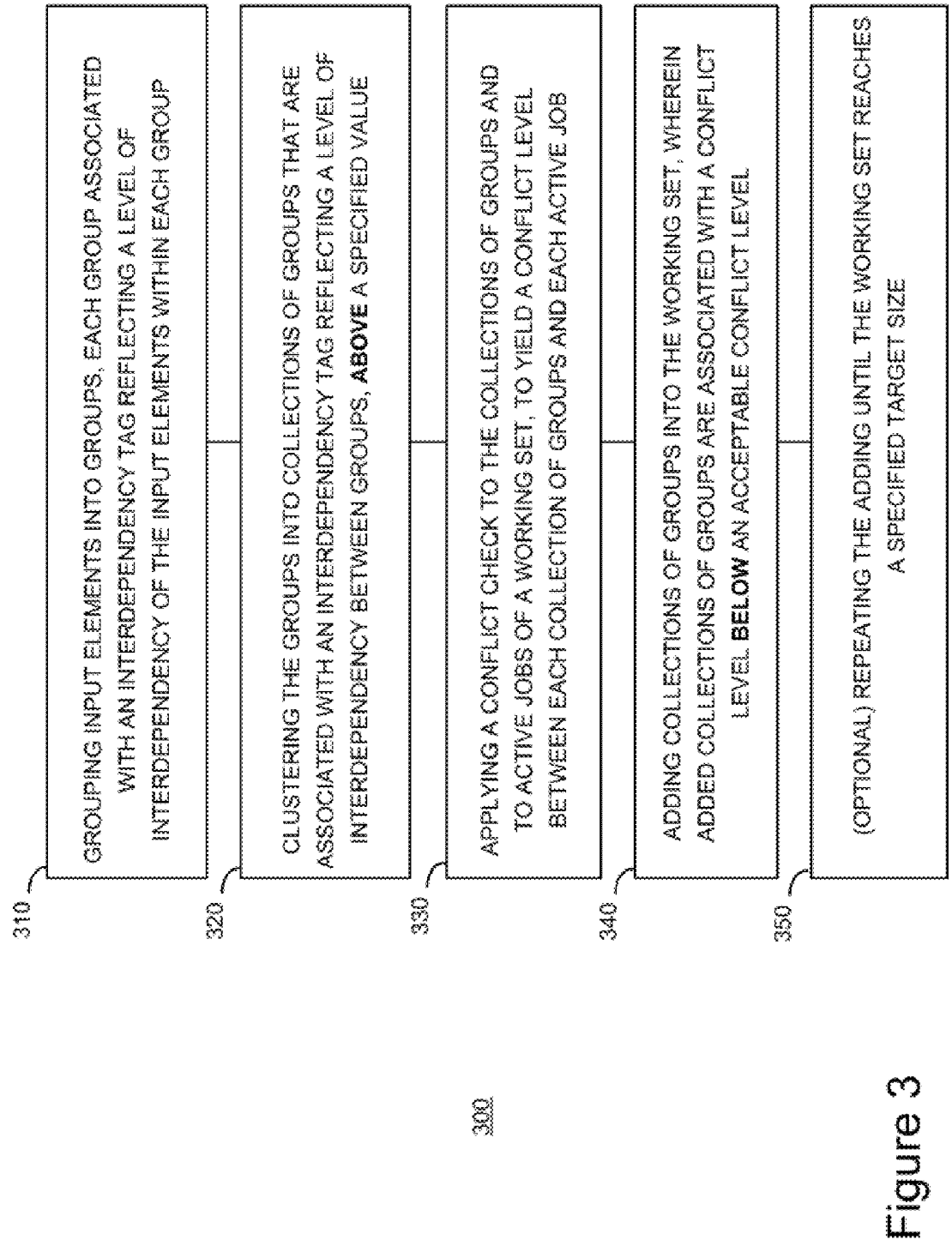
FIG. 3 is a high level flowchart diagram illustrating a method according to some embodiments of the invention.

FIG. 3 is a high level flowchart diagram illustrating a method according to some embodiments of the invention. It is understood that method 300 may be carried out by other means than of the aforementioned architecture of scheduler 132. However, for the sake of clarity, the following stages of method 300 are detailed below in conjunction with architecture of scheduler 132. Method 300 starts by grouping input elements into groups, by grouping unit 220 such that each group is associated with an interdependency tag reflecting a level of interdependency between data associated with different input elements within a group 310. The method goes on to clustering the groups by clustering unit 240 into collections of groups to yield collections of groups 320. Specifically, the clustered groups are associated with an interdependency tag reflecting a level of interdependency between groups, above a specified value. Then, using a conflict checker 270, the method proceeds to applying a conflict check to the collections of groups and to active jobs of a working set, to yield a conflict level between each collection of groups and each active job 330. This may be carried out by analyzing the interdependency tags of the collections of groups vis à vis interdependency tags associated with the active jobs 330. Finally, the method goes on to adding collections of groups, using adder 280 into the working set 340. Specifically, the added collections of groups are associated with a conflict level below an acceptable conflict level 340.

Optionally, method 300 may include repeating the adding until the working set reaches a specified target size. Additionally, in case the working set does not reach the specified target size, increasing the acceptable conflict level to a relaxed specified conflict level as may be set by the user.

Optionally, method 300 may include resuming processing of the working set with the added collections of groups whenever the target size is not reached within a specified period of time.

Consistent with one embodiment of the invention, method 300 may further include the step of submitting new jobs to the working set, wherein the new jobs are configured to process added collection of groups that are not being processed by the active jobs.

Consistent with one embodiment of the invention, method 300 may further include the step of repeating the grouping with additional incoming input elements in a rate based at least partially on the size of the working set.

The remainder of the description focuses on a concrete, non-limiting example based on data records with fields, with relation to the problem of identifying duplicate records, where the dependency among records abide all the rules stated above, and where dependency has a very clear meaning. When violated, there is also a clear penalty to the data throughput performance.

The example domain is telephony Call Detail Records (CDRs) apportioned into files of several thousands of CDRs each. Each CDR is generated by a component called network element (NE), and has a start time. To make the continuous time dimension more manageable, we divide it to time-slots such as 15 minutes, or 1 hour or a day. A start time falls into a certain time-slot, for instance, for a 15 minutes time slot, an event at 15:21:13 on Oct. 25, 2009 will fall into time-slot marked by its lower included bound Oct. 25, 2009 15:15:00, and whose upper excluded bound of Oct. 25, 2009 15:30:00.

Consistent with the aforementioned example, job scheduling task is to deliver groups of such files to processing so that no two records will be processed in any two distinct active jobs, so that they have same NE and same start time-slot. The universe of dependency items is a 3-tuple consisting of an identifier from a small group of distinct values, the second is the beginning of a time range, and the third is the end of that time range. Each record is marked with a 3-tuple [NE, start-time-slot, start-time-slot]. All CDRs in same input file share same NE, so they are tagged with dependency element [NE, min-start-time-slot, max-start-time-slot]. Two records exhibit dependency when they have the same dependency tag. Two input files exhibit dependency when their dependency tags share same NE and their time-slot range overlaps (i.e., max-start-time-slot of any of them does not exceed the min-start-time-slot of the other).

Scheduler 132 may implement the algorithm presented above with the following additional specialization to the case at hand: A group of files is tagged with an aggregated dependency tag defined in the following recursive definition:

A group consisting of a single file inherits the tag of its single file.

A file is added to a group if it conflicts the group, meaning that its tag conflicts the tag of the group.

Adding a file to a group extends its tag as follows, assuming the group tag to be [NEG, Ts1G, Ts2G] and the file's tag to be [NEF, Ts1F, Ts2F], than it is clear that due to the above bullet, NEF=NEG, and that the time-slot of each do overlap, and therefore we define the combined time-slot range to be Min(Ts1G, Ts1F) to Max(Ts2G, Ts2F).

A group is "closed" when a certain criteria is reached, such as total size of files in the group, or maximal number of files in a group. When there is no file which conflicts with the group (i.e., with members of the group), the group may also be closed, if its size is not a mandatory factor independent of the conflict-driven criteria discussed here. The scheduler than will schedule jobs only such which have no conflicts among them.

Conflict detection is very easy between any two groups or files by examining the three values in the tag. It is clear, for instance, that all files and groups from distinct NEs are not conflicting. When sorting the files and groups having tags with same NE, according to the lower bound of their time-slot range, it is clear that as long as a conflicting file is found; the next file in order may also be dependent (i.e., conflicting). Yet, as soon as a file in this order is encountered that does not conflict the test group of files, the next files in this order will not conflict neither. Therefore, it is possible to spend NLogN time to sort files and groups, where N is the number of files and groups tagged with same NE. Than the ordered list is scanned once, yet the first file candidate can be found by the division algorithm in LogN+K time, where K is the expected group size or number of files to be added to it.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
grouping input elements associated with one or more sources into groups, using one or more processors, each group being associated with an interdependency tag reflecting a level of interdependency between data associated with different input elements within a group, wherein an interdependency tag identifies an input element based on a higher order value and a lower order value, wherein the higher order value represents the source associated with the input element and the lower order value represents a time slot associated with the input element;
clustering the groups into collections of groups to yield collections of groups wherein the clustered groups are associated with an interdependency tag reflecting a level of interdependency between groups, above a specified value;
applying a conflict check to the collections of groups and to active jobs of a working set to yield a conflict level between each collection of groups and each active job, by analyzing the interdependency tags of the collections of groups in relation to interdependency tags associated with the active jobs, wherein no two input elements are processed in any two distinct active jobs, if both input elements share the same source and time slot as identified by the higher order value and the lower order value, respectively; and
adding collections of groups into the working set, wherein added collections of groups are associated with a conflict level below an acceptable conflict level so that each collection of groups is executed independently of other collections of groups included in the working set.

2. The method according to claim 1, further comprising repeating the adding until the working set reaches a specified target size.

3. The method according to claim 2, wherein in case the working set does not reach the specified target size, increasing the acceptable conflict level to a relaxed specified conflict level.

4. The method according to claim 2, further comprising resuming processing of the working set with the added collections of groups whenever the target size is not reached within a specified period of time.

5. The method according to claim 1, further comprising submitting new jobs to the working set, wherein the new jobs are configured to process added collection of groups that are not being processed by the active jobs.

6. The method according to claim 1, wherein the tag reflecting a level of interdependency exhibits a binary variable or a variable within a specified range.

7. The method according to claim 1, further comprising repeating the grouping with additional incoming input elements in a rate based at least partially on the size of the working set.

8. A scheduler comprising:
a grouping unit having one or more processors configured to group input elements associated with one or more sources into groups, each group being associated with an interdependency tag reflecting a level of interdependency between data associated with different input elements within a group, wherein an interdependency tag identifies an input element based on a higher order value and a lower order value, wherein the higher order value represents the source associated with the input element and the lower order value represents a time slot associated with the input element;
a clustering unit configured to cluster the groups into collections of groups to yield collections of groups wherein the clustered groups are associated with an interdependency tag reflecting a level of interdependency between groups, above a specified value;
a conflict checker configured to apply a conflict check to the collections of groups and to active jobs of a working set, to yield a conflict level between each collection of groups and each active job, by analyzing the interdependency tags of the collections of groups in relation to interdependency tags associated with the active jobs wherein no two input elements are processed in any two distinct active jobs, if both input elements share the same source and time slot as identified by the higher order value and the lower order value, respectively; and
an adder configured to add collections of groups into the working set, wherein added collections of groups are associated with a conflict level below an acceptable conflict level, so that each collection of groups is executed independently of other collections of groups included in the working set.

9. The scheduler according to claim 8, wherein the adder is further configured to repeat the adding until the working set reaches a specified target size.

10. The scheduler according to claim 9, wherein in case the working set does not reach the specified target size, the acceptable conflict level is increased to a relaxed specified conflict level.

11. The scheduler according to claim 9, wherein the system is further configured to resume processing of the working set with the added collections of groups whenever the target size is not reached within a specified period of time.

12. The scheduler according to claim 8, wherein the system is further configured to submit new jobs to the working set, wherein the new jobs are configured to process added collection of groups that are not being processed by the active jobs.

13. The scheduler according to claim 8, wherein the tag reflecting a level of interdependency exhibits a binary variable or a variable within a specified range.

14. The scheduler according to claim 8, wherein the grouping unit is further configured to repeat the grouping with additional incoming input elements in a rate based at least partially on the size of the working set.

15. A computer program product, the computer program product comprising: a non-transitory computer readable storage medium having computer readable program embodied therewith, wherein execution of the computer readable program on a computer causes the computer to:
group input elements associated with one or more sources into groups, using one or more processors, group being associated with an interdependency tag reflecting a level of interdependency between data associated with different input elements within a group, wherein an interdependency tag identifies an input element based on a higher order value and a lower order value, wherein the higher order value represents the source associated with the input element and the lower order value represents a time slot associated with the input element;
cluster the groups into collections of groups to yield collections of groups wherein the clustered groups are associated with an interdependency tag reflecting a level of interdependency between groups, above a specified value;
apply a conflict check to the collections of groups and to active jobs of a working set to yield a conflict level between each collection of groups and each active job, by analyzing the interdependency tags of the collections of groups in relation to interdependency tags associated with the active jobs, wherein no two input elements are processed in any two distinct active jobs, if both input elements share the same source and time slot as identified by the higher order value and the lower order value, respectively; and
add collections of groups into the working set, wherein added collections of groups are associated with a conflict level below an acceptable conflict level so that each collection of groups is executed independently of other collections of groups included in the working set.

16. The computer program product according to claim 15, further comprising computer readable program configured to repeat the adding until the working set reaches a specified target size.

17. The computer program product according to claim 16, further comprising computer readable program configured to increase the acceptable conflict level to a relaxed specified conflict level, in case the working set does not reach the specified target size.

18. The computer program product according to claim 16, further comprising computer readable program configured to resume processing of the working set with the added collections of groups whenever the target size is not reached within a specified period of time.

19. The computer program product according to claim 15, further comprising computer readable program configured to submit new jobs to the working set, wherein the new jobs are configured to process added collection of groups that are not being processed by the active jobs.

20. The computer program product according to claim 15, wherein the tag reflecting a level of interdependency exhibits a binary variable or a variable within a specified range.

21. The computer program product according to claim 15, further comprising computer readable program configured to repeat the grouping with additional incoming input elements in a rate based at least partially on the size of the working set.

* * * * *